May 31, 1938.  M. L. DONNELLAN  2,119,204
DEVICE FOR COOLING TIRES ON VEHICLE WHEELS
Filed Feb. 1, 1936
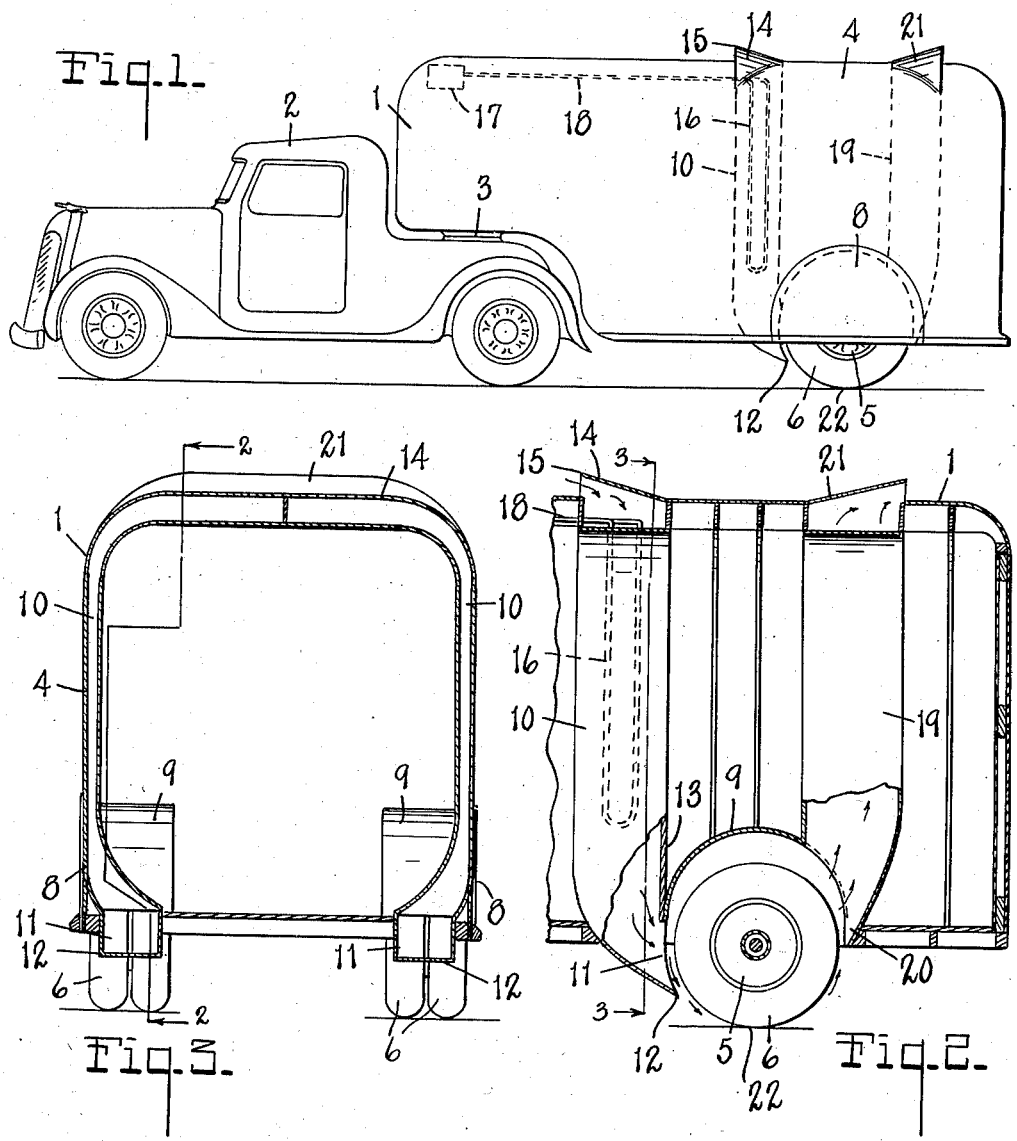
INVENTOR.
Maurice L. Donnellan
BY Chappell, Earl + Chappell
ATTORNEYS.

Patented May 31, 1938

2,119,204

UNITED STATES PATENT OFFICE 2,119,204

DEVICE FOR COOLING TIRES ON VEHICLE WHEELS

Maurice L. Donnellan, Kalamazoo, Mich.

Application February 1, 1936, Serial No. 61,980

8 Claims. (Cl. 180—1)

At the present time, nearly all vehicle wheels of the type such as pleasure automobiles, trucks, tractors and trailers are equipped with pneumatic tires. In operation along a road, whether it be paved or unpaved, there is a tendency for such tires to heat up. This heating up of the tires tends to cause deterioration thereof and an increase in the pneumatic pressure in the tire, which might lead to blow-outs or other tire trouble. The ordinary tire casing is made of rubber and a system of cords or fabrics and is flexible in use. The heating up of the tires may be due to several causes such as the heat of the road or pavement in the summer time, the flexing of the tire added to the pounding and friction of the tire at the point where it contacts the pavement. At the present time there is a trend toward stream lining all such vehicles and in many instances practically the entire wheel and tire are encased by some sort of an air foil. When this situation exists, the tire does not have as complete an opportunity to cool off as it would have were it completely open, and at the speed of travel of vehicles of the present time, the tendency toward heating of the tire might lead to serious difficulties.

The objects of my invention are:

First, to provide a suitable means for cooling tires on vehicle wheels.

Second, to produce such a device which utilizes the rotation of the tire to carry cooling air to the point of contact with the pavement or road.

Third, to provide such a device in which the movement of the vehicle through the atmosphere may be utilized to provide the necessary flow of air.

Fourth, to provide a new and improved method of cooling vehicle tires.

Fifth, to provide such a method in which the rotation of the wheel while the vehicle is in motion is employed to carry the cooling air to the point of impact with the pavement.

Other objects and advantages pertaining to details and economies of construction and operation will appear from the description to follow. A preferred embodiment of my invention is illustrated in the accompanying drawing, in which:

Fig. 1 is an elevation view of a tractor and trailer in which my invention is embodied.

Fig. 2 is a detail view, partly in section, of the rear portion of the trailer shown in Fig. 1, taken on line 2—2 of Fig. 3.

Fig. 3 is a sectional view taken on line 3—3 of Fig. 2.

In the drawing, 1 is a trailer which is suitably connected to a tractor 2 by means of a swivel joint 3, which is not shown in detail. The trailer has a body 4 and suitable wheels 5 which are here shown provided with pneumatic tires 6. The sides of the body 4 of the trailer are provided with portions 8 which extend over the outside of the wheels and tires as shown to form with the curved encasing members 9 a casing which partially encloses the wheels and tires. 10 is an inlet duct terminating at one end 11 in a discharge. This discharge is directed at the leading edge of the tire 6 and in a general downward direction. The point 12 is shown located in a position to provide sufficient road clearance and the wall 13 of the duct 10 and the encasing member 9 come together as shown to prevent the creation of a back pressure in the duct 10 by the rotation of the wheel 6 which rotates in a counter-clockwise direction as viewed in Figs. 1 and 2. The upper end 14 of the duct 10 is formed into a scoop which is positioned in a manner to project from the body of the vehicle as shown to pick up air as the vehicle passes through the atmosphere. The air picked up is forced through the duct and discharged against the leading edge of the tire 6 as is shown by the small arrows in Fig. 2.

In the device shown in Figs. 1 and 2, it will be noticed that the scoop portion 15 at the end of the duct 10 is positioned so that the air picked up thereby will be cooler than would be the air near the pavement. If, however, the heat is such that the air picked up at this point is not sufficient for cooling, I may use the cooling coils 16 which are connected to a refrigerating unit 17 by a suitable pipe 18 which may be insulated if desired. The unit 17 is the typical refrigerating unit which is used in refrigerated trucks or trailers and has not been shown in detail. The air passing through the duct 10 and over the cooling coil 16 will be cooled sufficiently to efficiently cool the tire 6 during the hottest weather.

At the rear of the casing formed by the members 8 and 9 is a discharge duct 19. The end 20 of this duct is arranged as a scoop to pick up air which is caused to flow by the rotation of the wheel 5 and tire 6. The upper end 21 of the duct 19 is formed as an ejector so that the air passing thereover will tend to draw air from the duct 19 as indicated by the small arrows in Fig. 2.

In operation, as the vehicle moves along, air enters at the scoop 15 and passes down through the duct 10 and is discharged at 12 against the leading edge of the tire 6. The tire, which is substantially enclosed in a casing, acts as a fan wheel and pulls the air down to the point of contact with the road 22. This tends to cool the tire at the point of greatest heating where the flexing, pounding and friction heat the tire most. The air then passes around as shown by the small arrows in Fig. 2 and out through the inlet 20 of the duct 19. The ejector action at the end 21 of duct 19 tends to exhaust the air from the duct 19 which in turn exhausts the air from a point at the rear of the tire 6. It will be noted that the air is discharged about half way down on the front of the tire as this is the most efficient place for the discharge of air to the tire for cooling.

It will be appreciated that various changes and modifications can be made without departing from my invention.

Having thus described my invention, what I claim as new and desire to secure by Letters Patent is:

1. In a device for cooling tires on vehicle wheels when the vehicle is in motion, the combination of means partially enclosing the wheel and tire to form a casing therefor, an inlet duct having at one end a discharge disposed to discharge air into the casing and toward the front of the tire and in a downward direction, said inlet duct having at its other end a scoop positioned to pick up air when the vehicle is in motion, means in said inlet duct to cool air passing therethrough, an outlet from said casing disposed at the rear of the tire to scoop up air circulated by the rotation of the wheel in the casing, and an outlet duct extending from said outlet and having its other end formed as an ejector, whereby the passage of the vehicle through the air tends to exhaust air from said outlet duct.

2. In a device for cooling tires on vehicle wheels when the vehicle is in motion, the combination of means partially enclosing the wheel and tire to form a casing therefor, an inlet duct having at one end a discharge disposed to discharge air into the casing and toward the front of the tire, said inlet duct having at its other end a scoop positioned to pick up air when the vehicle is in motion, an outlet from said casing disposed at the rear of the tire to scoop up air circulated by the rotation of the wheel in the casing, and an outlet duct extending from said outlet and having its other end formed as an ejector, whereby the passage of the vehicle through the air tends to exhaust air from said outlet duct.

3. In a device for cooling tires on vehicle wheels when the vehicle is in motion, the combination of means partially enclosing the wheel and tire to form a casing therefor, an inlet duct having at one end a discharge disposed to discharge air into the casing and toward the front of the tire and in a downward direction, means for causing a flow of air through said inlet duct to said discharge, an outlet from said casing disposed at the rear of the tire to scoop up air circulated by the rotation of the wheel in the casing, and an outlet duct extending from said outlet.

4. In a device for cooling tires on vehicle wheels when the vehicle is in motion, the combination of means partially enclosing the wheel and tire to form a casing therefor, an inlet duct having at one end a discharge disposed to discharge air into the casing and toward the front of the tire, means for causing a flow of air through said inlet duct to said discharge, an outlet from said casing disposed at the rear of the tire to permit air circulated by the rotation of the wheel in the casing to pass from said casing.

5. In a device for cooling tires on vehicle wheels when the vehicle is in motion, the combination of an inlet duct having at one end a discharge disposed to discharge air toward the front of the tire and in a downward direction, said inlet duct having at its other end a scoop positioned to pick up air when the vehicle is in motion, means in said inlet duct to cool air passing therethrough, an outlet duct with one end disposed at the rear of the tire to scoop up air circulated by the rotation of the wheel in the casing and having its other end formed as an ejector, whereby the passage of the vehicle through the air tends to exhaust air from said outlet duct.

6. In a device for cooling tires on vehicle wheels when the vehicle is in motion, the combination of an inlet duct having at one end a discharge disposed to discharge air toward the front of the tire and in a downward direction, said inlet duct having at its other end a scoop positioned to pick up air when the vehicle is in motion, an outlet duct with one end disposed at the rear of the tire to scoop up air circulated by the rotation of the wheel, and having its other end formed as an ejector, whereby the passage of the vehicle through the air tends to exhaust air from said outlet duct.

7. In a device for cooling tires on vehicle wheels when the vehicle is in motion, the combination of an inlet duct having at one end a discharge disposed to discharge air toward the front of the tire, means for causing a flow of air through said inlet duct to said discharge, and an outlet duct with one end disposed at the rear of the tire to scoop up air circulated by the rotation of the wheel in the casing.

8. In a device for preventing overheating of a tire on the wheel of a vehicle when the vehicle is in motion, the combination of a casing enclosing the periphery and sides of the upper portion of the tire and wheel to an extent that the wheel and tire will on rotation cause a circulation of air around the casing in the direction in which the wheel is being rotated, and a duct disposed to discharge cooling air into the casing and at the leading edge of the tire when the vehicle is in motion, whereby the rotation of the wheel and tire carries the cooling air down to the point of contact of the tire with the road.

MAURICE L. DONNELLAN.